United States Patent [19]
Schady

[11] 3,988,133
[45] Oct. 26, 1976

[54] CYCLONE APPARATUS

[75] Inventor: Joseph L. Schady, Beechurst, N.Y.

[73] Assignee: Alpha Sheet Metal Works, Inc., Woodside, N.Y.

[22] Filed: Sept. 8, 1975

[21] Appl. No.: 611,173

Related U.S. Application Data

[60] Division of Ser. No. 417,362, Nov. 19, 1973, which is a continuation-in-part of Ser. No. 198,847, Nov. 15, 1971, abandoned.

[52] U.S. Cl. .................................................. 55/459 R
[51] Int. Cl.² ........................................... B01D 45/12
[58] Field of Search ............. 55/391, 392, 394–396, 55/456, 457, 458, 459; 209/211, 144; 210/512

[56] References Cited
UNITED STATES PATENTS

| | | | |
|---|---|---|---|
| 1,066,704 | 7/1913 | Brassert | 55/457 |
| 1,239,456 | 9/1917 | Brantingham et al. | 55/394 |
| 1,854,738 | 4/1932 | Hays | 55/459 R |
| 2,672,215 | 3/1954 | Schmid | 55/459 R |

*Primary Examiner*—Bernard Nozick
*Attorney, Agent, or Firm*—Robert E. Isner

[57] ABSTRACT

An apparatus for enrobing discrete objects. The device includes a perforated drum adapted to receive and tumble a charge of discrete objects to be coated and which is rotatable about its horizontal axis. The tumbling charge is periodically wetted with coating material and is dried by a stream of selectively conditioned air passed through the charge. During the initial phase of each drying operation a high velocity conditioned air stream employing a high percentage of reconditioned air is employed that effects rapid drying without deleteriously affecting the surface of the coated objects. During the final phase of each drying operation velocities are reduced and higher percentages of unrecirculated conditioned air is employed to assure continuity of drying with a concomitant production of an optimum surface of coating material thereon.

2 Claims, 4 Drawing Figures

U.S. Patent  Oct. 26, 1976  Sheet 2 of 2  3,988,133
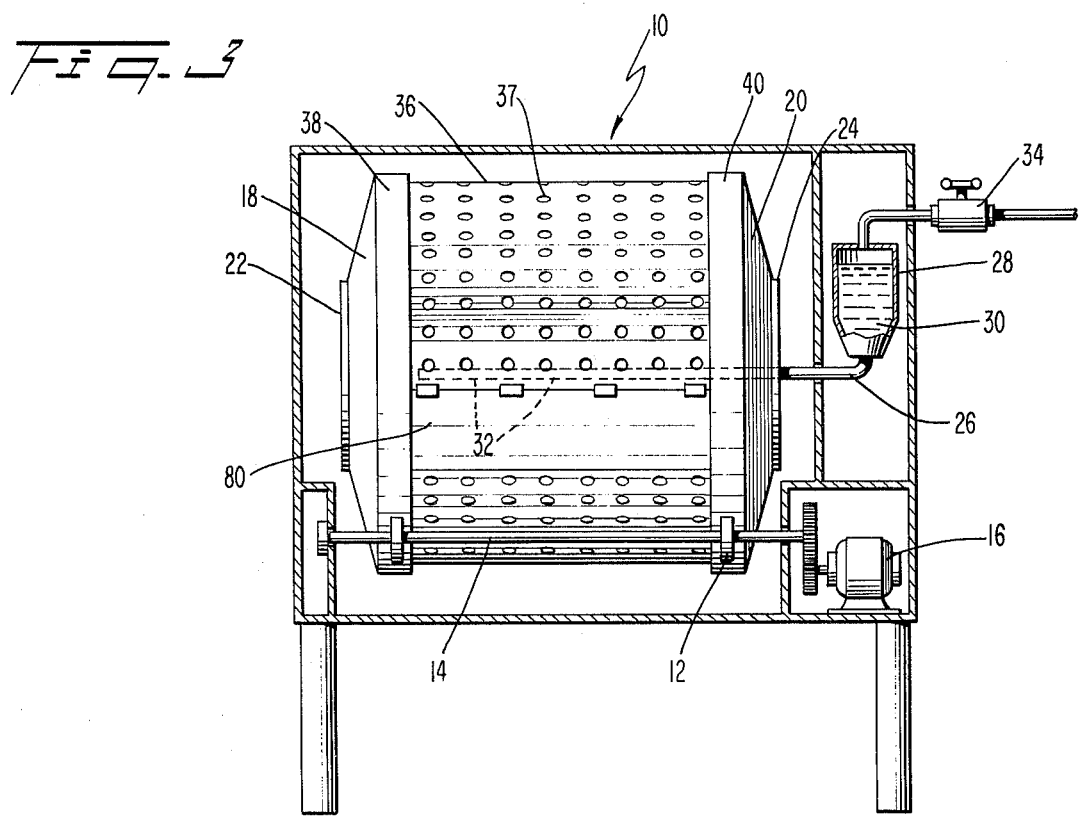
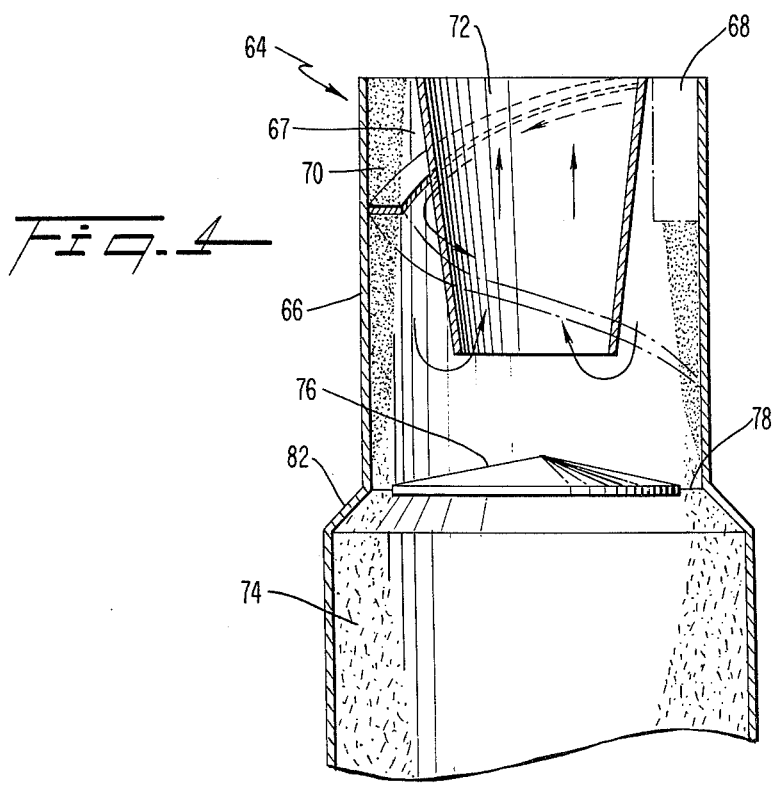

CYCLONE APPARATUS

This application is a division of pending application Ser. No. 417,362, filed Nov. 19, 1973, which latter case is a continuation-in-part of the now abandoned parent application Ser. No. 198,847 filed Nov. 15, 1971.

This invention relates to enrobing or candying apparatus for the manufacture of coated confectionery tablets, medicinal pills or the like.

Confectionery tablets are traditionally coated by introducing a charge of tablets or the like base material into a rotatable drum rotating the drum whereby the charge is tumbled and maintained as discrete entities, spraying or otherwise discharging a syrup or other coating materials onto the charge, and passing a stream of air past the wetted tablets or other objects during tumbling to dry the wetted surfaces thereof.

The character and appearance of the resultant product is extremely sensitive to process variations. For example, the amount of moisture in the drying air stream will materially effect the rate of drying of the wetted charge and the economics of the operation. Likewise, the presence of coating material dust in the drying air stream will often result in the surface of the dried and coated tablets being "pimpled" and if the temperature and velocity of the drying air stream are not controlled, varying types of surface imperfections will result in the finished coatings. For example, excess air velocity normally results in undue agitation of the wetted charge and production of a finished surface having an appearance very similar to that of an orange peel.

Since, in conventional practice, the drying process inherently results in moisture being evaporated from the wetted charge into the drying air stream and since the tumbling of the charge inherently results in the production of dust in the form of dried syrup being entrained in the drying air stream, conventional apparatus and practice have dictated that the drying air stream be exhausted from the apparatus. The costs of conditioned air, the hazards of air pollution and the maintenance of a controlled plant environment in the vicinity of fabricating machines of the type herein of concern coupled with ever increasing demands for greater outputs of high quality products have created serious economic problems for enrobing operations which have not been satisfied by modifications and adjuncts to existing apparatus.

This invention may be briefly described as an improved method and apparatus for the enrobing of tablets and other discrete objects in which a contained charge of wetted objects is subjected to controlled velocity flows of selectively conditioned air to effect high speed quantity production of high quality enrobed objects in an economic manner.

The primary object of this invention is the provision of an improved method and apparatus for enrobing tablets or like articles.

Accordingly, it is a further object of the present invention to reduce the duration of the drying cycle by increasing the velocity of the drying air stream substantially beyond that of conventionally utilized air streams for at least a portion of the drying cycle without detrimentally affecting the surface of the coated tablets.

A further object of this invention is the provision of a highly economic drying cycle through the utilization of relatively large quantities of recirculated air during at least a substantial portion of the drying cycle.

A still further object of this invention is the provision of improved enrobing apparatus and mode of operation thereof that permits marked reduction in the periods of time required to produce high quality enrobed products with consequent economic benefits attendant therewith.

It is also an object of the present invention to efficiently utilize the air stream by forcing it through the mass or charge of wetted tablets whereby the scrubbing action thereof will reduce the duration of the drying cycle.

It is a further object of the present invention to provide an enrobing or coating apparatus in which the charge of uncoated tablets and the charge of enrobed tablets can be quickly loaded thereinto and unloaded therefrom.

It is yet a further object of the present invention to provide an air classifier whereby dust particles which become entrained in the drying air stream can be separated therefrom with extremely high efficiency.

Among the advantages of the present invention is the provision of an enrobing apparatus in which a substantial portion of the drying air stream can be recycles for a major portion of the drying cycle thereby minimizing the required supply of conditioned air and the volume of air exhausted to the environment with attendent economics of operation.

Other objects and advantages of the present invention will become apparent from the following portion of this specification and from the accompanying drawings which illustrate, in accord with the mandate of the patent statute, a presently preferred embodiment incorporating the teachings of the invention. Referring to the drawings:

FIG. 3 is a front elevational view in cross-section of the enrobing apparatus illustrated in FIGS. 1 and 2;

FIG. 4 is an elevational view in cross-section of the air classifier illustrated in FIG. 2.

Figure 2:
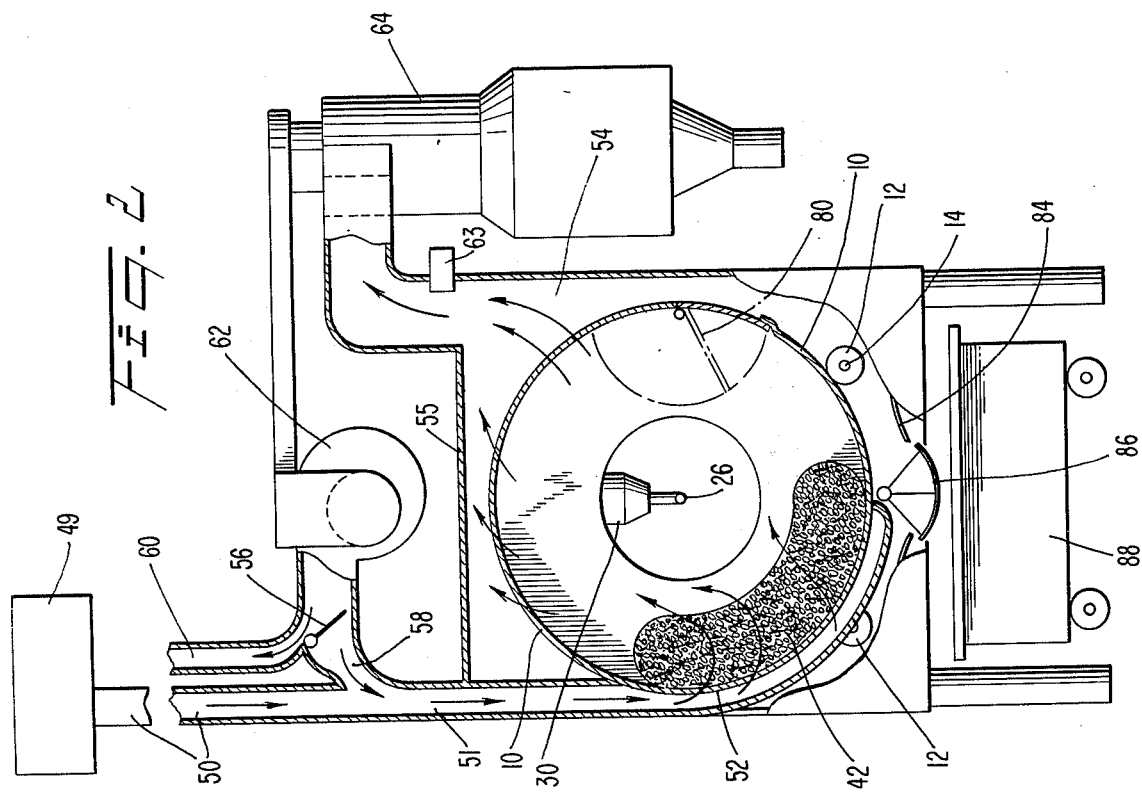
FIG. 2 is an end elevational view in cross-section of the enrobing apparatus illustrated in FIG. 1.
Figure 1:
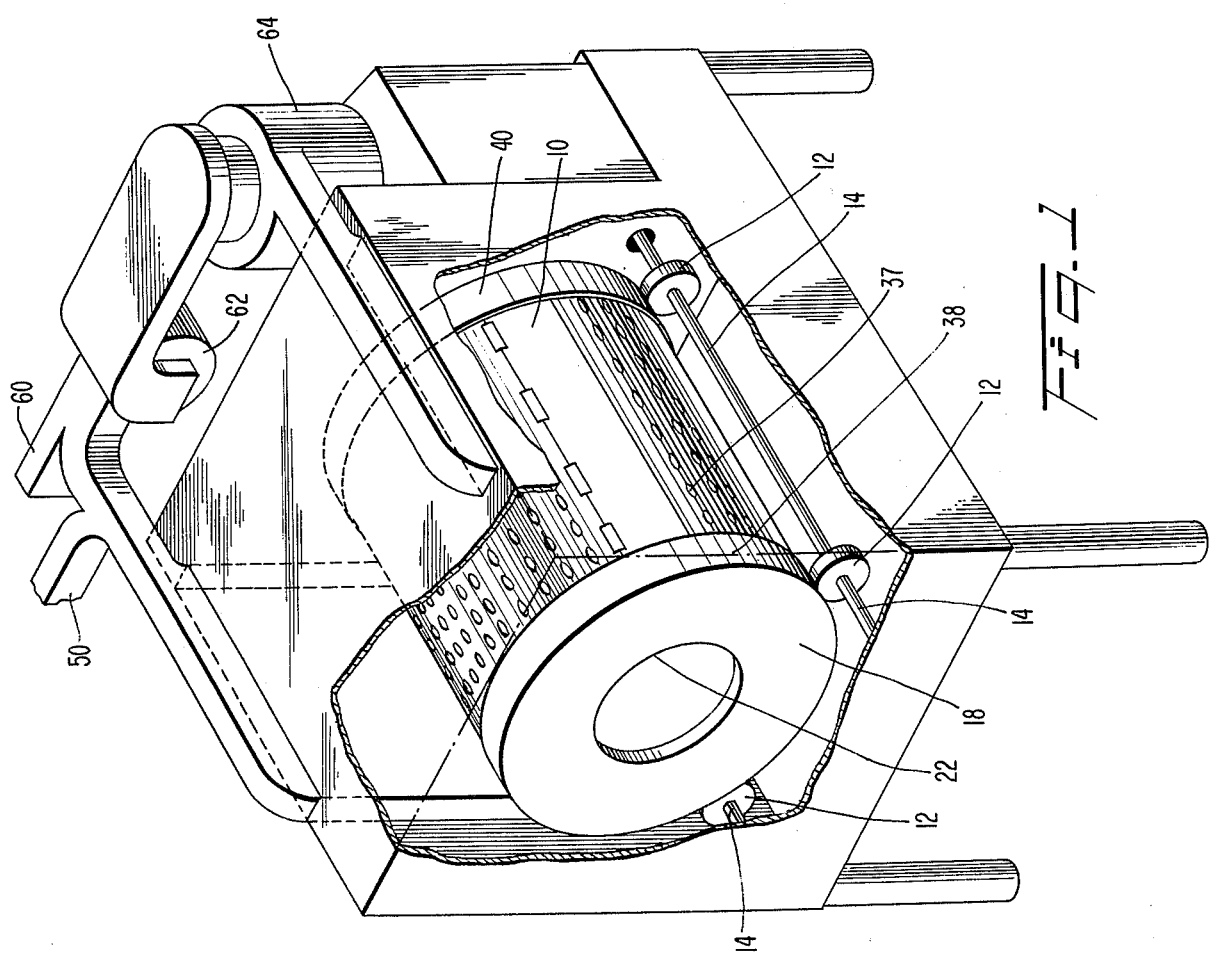
FIG. 1 is a perspective view of the enrobing apparatus of the present invention.

Referring to the drawings and initially to FIGS. 1, 2 and 3 an apparatus for coating or enrobing discrete objects, which may be in the form of confectionery tablets, medicinal pills or the like and incorporating the principles of this invention is illustrated. The apparatus includes a substantially cylindrical drum 10 disposed so that the axis thereof is substantially horizontal. The drum is rotationally supported by four driving wheels 12. The driving wheels are fixedly secured to a parallel pair of horizontal drive shafts 14 which are rotationally driven through a conventional linkage (not shown) by a motor 16. The drum accordingly "floats" on the driving wheels 12 and is rotated about its substantially horizontal axis at any selected speed. The drum includes opposing end plates or covers 18, 20 and each of these end plates preferably includes an opening 22, 24, which is concentric to the axis of the drum. Uncoated pills or tablets can then be introduced into the drum through one of these end plate openings 22 and a conduit 26 can be passed through the other end plate opening 24 and extended axially along the drum for directing liquid coating material 28, which may be a sugar slurry or other syrup, from a suitable source 30 to a plurality of apertures 32 or spray nozzles located along the conduit. The quantity of syrup or slurry poured, sprayed, or otherwise discharged into the drum is controlled by a valve 34 which may be integrated into a computerized control system.

The cylindrical portion of the drum 36 intermediate the two end plates is perforated with a plurality of holes 37 which are sufficiently small in cross-sectional area to prevent the tablets or pills from passing therethrough but which, when taken as an entirety, provide an area sufficiently large to allow air to pass therethrough in the desired manner. A pair of peripheral tracks 38, 40 are located at either end of the perforated cylindrical portion 36 to provide suitable surfaces for the driving wheels 12 to engage for rotating the drum 10.

In the operation of the described unit, preselected mass or charge of uncoated pills, tablets or the like, suitably at room temperature (75° F) or the like is introduced into the drum 10. The drum 10 is rotated at a relatively slow speed whereby the charge of discrete objects will continually tumble in the form of a bed or pile 42. Portions of this tumbling bed will fall into contact with the interior peripheral surface of the perforated drum during each revolution thereof and any relative motion between the portion of the bed engaging the drum surface and the surface of the rotating drum can be minimized by the utilization of louvers (not shown) or other elements which project inwardly from the interior surface of the drum. Such louvers prevent the undersurface of the bed from sliding down the interior surface of the drum and also serve to axially throw the charge in selected directions as it commences to tumble whereby the most desirable circulation patterns can be achieved.

In the operation of the unit the tumbling bed of tablets or the like is periodically wetted with liquid coating material intermediate the hereinafter described drying cycles. As illustrative of the improved results attendant operation of the subject unit such a tumbling bed can now be wetted with a selected amount of syrup as often as every 3 to 5 minutes with the overall processing time being reduced from the presently conventionally practiced norm of 6 or more hours to 3 hours or less and concomitantly produce a high quality product having the desired coating thickness thereon.

The operation of the described enrobing machine will be further described for one of these drying cycles but it is to be appreciated that the same principles will apply to each of the many drying cycles (one after each wetting) required to produce coated tablets having a desired coating thickness.

Air which is selectively conditioned, by conventional means 49, to have approximately 90° F temperature and a dew point of approximately 25° F is delivered under pressure via a conditioned air supply duct 50 and an inlet manifold 51 to an air inlet 52. The air inlet axially traverses the perforated section of the drum and extends peripherally around the entire leading lower quadrant thereof.

The charge of uncoated discrete particles is selectively sized so that, as the bed 42 is rotated through the leading lower quadrant, the charge will completely block the air inlet 52 for at least a brief period of time. It is presently preferred that the charge peripherally extend over an arc of approximately 110° while it is carried by the rotating drum and that the air inlet extend over an arc of approximately 80° so as to assure passage of the air through the tumbling charge with a minimization, if not total avoidance, of any bypassing thereof.

The bed 42 of coated articles is dried, intermediate each wetting thereof, in two phases. During the first phase of each of the drying cycles, and which first phase will usually comprise the major time portion thereof, a mixture of conditioned and recirculated air will be introduced through the air inlet 52 and is passed inwardly through the drum surface and through the charge at relatively high velocities. During the initial portion of the first phase of the drying cycle moisture will be removed from the charge at a relatively high rate due to the essential identity of characteristics between the conditioned air and recirculated air components of the air stream. Such rate of moisture pick-up will however, progressively decrease, as the recirculated air component of the air stream accumulates moisture. During the second phase of each of the drying cycles, which normally will comprise the last and minor time portion of the drying cycle, preferably only conditioned air is employed with little or no recirculation and such is passed through the charge at markedly reduced velocities.

I have found that the above described drying cycle not only materially reduces the overall time required for enrobing, but concomitantly effects the same with a marked avoidance of deleterious "orange peel" surface defects in the finished product (believed to be effected by high air velocity) and does so with marked economic savings due to minimized use of conditioned air.

In the first phase of the drying cycle, a major portion of the drying air stream which passes through the drum 10 into the discharge manifold 54, which is formed by the casing 55 of the apparatus, is recycled to again and repetitively pass through the rotating drum. This recycled air will have a moisture content at least slightly higher than the moisture content of the conditioned air entry stream and accordingly the moisture content of the merged flow of conditioned and recycled air tends to incrementally, but slowly increase.

The amount of air to be recirculated through the drum is controlled by the flap valve or shutter 56 which is pivotally mounted intermediate the recirculating air conduit 58 and the air exhaust conduit 60 and which can be selectively positioned so as to sub-divide the discharged drying air stream in any desired ratio. Preferably during the first phase of a drying cycle, 80% of the merged drying air stream directed to the air inlet 52 will be constituted by recirculated air. The specific ratio of recycled to conditioned air in the merged air stream is determined and controllable so that the moisture content of the composite drying air stream which initially had a low dew point (25° F) will not increase beyond a predetermined maximum value (say, about 40° F) during the time when the drying air is being at least partially recycled through the drum 10. This assures that the drying rate of the wetted tablets will not be substantially retarded during this high velocity first phase of the drying cycle.

To step up the velocity of the recirculated air stream and to thereby substantially step up the velocity of the composite drying air stream passing through the drum 10 during the first phase of the drying cycle, an adjustable blower 62 is located upstream of the exhaust duct 60 and recirculating conduit 58. Preferably the blower 62 is arranged so that a negative pressure will be created within the drum so that the drying air stream will be pulled therethrough.

As pointed out above, the velocity of the merged or composite drying air stream in the first phase of the drying cycle is markedly increased in order that the impact of this stream against the wetted charge while the charge is blocking the air inlet will be of sufficient magnitude to cause the air stream to force its way completely through the bed or charge 42. The bed is accordingly scrubbed by a high velocity air stream during first phase of the drying cycle and such high velocity scrubbing substantially shortens the duration of such first phase operation.

During the described first phase of the drying cycle, a considerable amount of dust, emanating from the drying coating material in the tumbling charge, becomes entrained in the drying air stream. Such dust particles, if recycled in conjunction with the reconditioned air would deleteriously mar the surface of the coated objects. In order to remove such dust particles, the drying air stream, after its removal from the drum, is passed through an air classifier or dust separator 64 wherein these particles are effectively removed.

The details of preferred construction for such dust separator 64 are illustrated in FIG. 4. Such separator is generally of the so-called cyclone type and has a substantially cylindrical casing 66 defining the separating chamber 67, an air inlet 68 in the form of a skew or tangential passage, and a deflector bar 70 for directing the air stream introduced into the separating chamber downwardly and into the axial outlet duct 72. A separating vortex is accordingly established which effectively throws the entrained particles outwardly against the sides of the cylindrical casing 66. These particles therefore substantially escape the separating vortex and drop downwardly towards the cylindrical collecting chamber 74.

A conical baffle member 76 is coaxially positioned at the base of the casing 66 with the apex thereof extending into the separating chamber 67 and the baffle 76 is sized so as to provide a small annular spacing 78 between the periphery of the conical baffle member 76 and the casing wall 66. By flaring the wall of the casing, as at 82, proximate the lowermost periphery of the concial member, outwardly directed small currents of air which inherently flow from the separating chamber to the collecting chamber and which often become redirected back into the separating chamber 67 carrying therewith dust particles which has already been separated from the drying air stream, react to this outwardly flaring casing very much as if such currents were passed through a divergent nozzle. Sudden expansion results and the entrained particles fall to the bottom of the collecting chamber since the velocity of these stray air currents has suddenly been reduced to zero.

In conventional funnel shaped collecting chambers of the cyclone type high efficiency has only been achieved with large particles. For example, a conventional high velocity, high efficiency cyclone will separate particles of 5 microns or larger at a 90% efficiency. Three micron particles will be separated at a 40% efficiency factor and particles 2 microns or smaller in size are separate at less than a 10% efficiency rate. It is believed that the reason for this decrease in efficiency rate with decrease in particle size is due to the fact that these smaller particles accumulate about the funnel shaped collector in well defined orbital patterns whereby they can be easily entrained in the above described stray currents which are returned to the separator. By replacing the conventional collecting chamber having funnel shaped walls with a collecting chamber 74 having perfectly vertical walls the presence of such orbitally patterned accumulation of dust are eliminated and cyclone efficiency is increases. With the air classifier of the present invention a 97% efficiency is achievable with 2 micron particles and separation can be effected with particles as small as ½ micron.

As will now be apparent, the inclusion of the air classifier or dust separator assembly in the exhaust air stream from the drum 36 insures recirculation of a substantially particulate free drying air stream with a consequent minimization of pitting or pimpmling of the tumbling charge with its deleterious effect on the surface characteristiics thereof.

After the conclusion of the first phase of each of the drying cycles, the velocity of the drying air stream through the tumbling charge is materially reduced to minimize, if not avoid the detrimental effects thereof on the tablet surfaces. In conjunction therewith, preferably all or substantially all of the drying air streams, after passage through the drum, is externally vented through the exhaust duct 60 and conditioned air is essentially used for the drying air stream. At the initiation of the second phase of the drying cycle and due to the use of conditioned air as the drying stream a further substantial moisture transfer will take place from the charge. Conveniently, an instrument such as a hygrometer 63 can be positoned within the discharge manifold 54 so that the transitions in moisture content can be observed and the shutter or flaps 56 cna be displaced accordingly.

To remove the dried tablets or the like from the coating apparatus, the drum 10 is rotated until the axially extending discharge hatch or door 80 (FIGS. 2 and 3) is rotated until the discharge opening 80 is located at the bottom of the drum. The coated tablets can then be easily dumped into the funnel like bottom 84 of the apparatus casing and through the clam shell gate 46 into a suitable pick up hopper 88.

To clean the drum, water, under pressure, can be sprayed through the drum form the inside to the outside thereof. This wash water will also be discharged from the clam shell gate 86 into a suitable receptacle.

Having thus described the invention, what is claimed is:

1. An air classifier for separating particulate matter from a gaseous carrier comprising
   a cylindrically shapped separating chamber,
   tangential air inlet conduit means,
   axial and concentric air outlet conduit means,
   means for directing the air introduced into said separating chamber to rotate thereabout in a predefined flow path whereby a separating vortex will be formed and the entrained particulate matter will be thrown radially outwardly towards the walls of said separating chamber,
   a cylindrical collecting chamber coaxial with said separting chamber wherein the diameter of said collecting chamber is substantially larger than the diameter of said separating chamber,
   a flared out skirt member joining said collecting separating chambers,
   conical baffel means concentric with and positoned at the bottom of said collecting chamber with the apex thereof projecting thereinto,
   said conical baffle means defining an annular opening with said flared out skirt member whereby stray currents created by the separating vortex become suddenly expanded when passed therethrough, releasing any particulate matter entrained therein thereby assuring that the separated particulate matter will fall to the bottom of said collecting chamber.

2. An air classifier for separating particulate matter from a gaseous carrier according to claim 1 wherein the base of said conical baffle lies in substantially the same plane as the top of said flared out skirt member.

* * * * *